(12) United States Patent
Ahonen et al.

(10) Patent No.: US 9,578,154 B2
(45) Date of Patent: Feb. 21, 2017

(54) MOBILE COMMUNICATION TERMINAL AND METHOD

(75) Inventors: Petri A. Ahonen, Jyvaskyla (FI); Erkki Kurkinen, Puuppola (FI); Pasi A. Kaipainen, Jyvaskyla (FI)

(73) Assignee: Nokia Technologies Oy, Espoo (FI)

( * ) Notice: Subject to any disclaimer, the term of this patent is extended or adjusted under 35 U.S.C. 154(b) by 465 days.

(21) Appl. No.: 11/622,604

(22) Filed: Jan. 12, 2007

(65) Prior Publication Data
US 2008/0171539 A1  Jul. 17, 2008

(51) Int. Cl.
| | |
|---|---|
| *H04M 1/00* | (2006.01) |
| *H04M 1/725* | (2006.01) |
| *G06F 1/16* | (2006.01) |
| *H04M 1/66* | (2006.01) |
| *H04W 52/02* | (2009.01) |

(52) U.S. Cl.
CPC ........ *H04M 1/72519* (2013.01); *G06F 1/1626* (2013.01); *G06F 1/1684* (2013.01); *H04M 1/66* (2013.01); *G06F 2200/1637* (2013.01); *H04M 2250/12* (2013.01); *H04W 52/0254* (2013.01)

(58) Field of Classification Search
USPC .............................................. 455/550.1, 411
See application file for complete search history.

(56) References Cited

U.S. PATENT DOCUMENTS

| | | | |
|---|---|---|---|
| 3,937,002 A | 2/1976 | Van Haaften | |
| 5,724,492 A | 3/1998 | Matthews et al. | |
| 6,434,370 B1 * | 8/2002 | Kodera et al. | ............... 455/90.1 |
| 6,549,792 B1 | 4/2003 | Cannon et al. | |
| 6,867,786 B2 | 3/2005 | Lui et al. | |
| 7,422,145 B2 | 9/2008 | Nurmela et al. | |
| 7,551,947 B2 * | 6/2009 | Yoshida | ........................ 455/567 |
| 2002/0167699 A1 | 11/2002 | Verplaetse et al. | |
| 2003/0103091 A1 | 6/2003 | Wong et al. | |
| 2004/0075700 A1 | 4/2004 | Liu et al. | |

(Continued)

FOREIGN PATENT DOCUMENTS

| | | |
|---|---|---|
| DE | 203 13 202 U1 | 12/2003 |
| DE | 10 2004 061169 A1 | 6/2006 |

(Continued)

OTHER PUBLICATIONS

U.S. Appl. No. 11/371,318, filed Mar. 8, 2006.

(Continued)

*Primary Examiner* — Ankur Jain
(74) *Attorney, Agent, or Firm* — Alston & Bird LLP

(57) ABSTRACT

It is presented a method for providing a user interface of a mobile communication terminal including a motion sensitive sensor, a keypad and a display, the mobile communication terminal being capable of being in at least an active mode and a key-lock mode, the method including: detecting, using the motion sensitive sensor, a first user input indicating a desire to switch modes; when the mobile communication terminal is in the active mode, as a response to the first user input, switching the mobile communication terminal to the key-lock mode; and when the mobile communication terminal is in the key-lock mode, as a response to the first user input, switching the mobile communication terminal to the active mode. Corresponding apparatuses and computer program products are also presented.

23 Claims, 4 Drawing Sheets

(56) References Cited

U.S. PATENT DOCUMENTS

| | | | |
|---|---|---|---|
| 2004/0100871 A1 | 5/2004 | Yamazaki | |
| 2005/0024341 A1 | 2/2005 | Gillespie et al. | |
| 2005/0097478 A1* | 5/2005 | Killian | G06F 3/0481 715/851 |
| 2005/0212749 A1 | 9/2005 | Marvit et al. | |
| 2006/0125782 A1 | 6/2006 | Orchard et al. | |
| 2006/0197750 A1 | 9/2006 | Kerr et al. | |
| 2006/0242434 A1 | 10/2006 | Lee | |
| 2007/0049358 A1* | 3/2007 | Kang et al. | 455/575.1 |
| 2007/0247434 A1 | 10/2007 | Cradick et al. | |
| 2007/0259685 A1* | 11/2007 | Engblom et al. | 455/550.1 |
| 2008/0074400 A1 | 3/2008 | Gettemy et al. | |
| 2008/0108338 A1* | 5/2008 | Herrero Veron et al. | 455/414.3 |

FOREIGN PATENT DOCUMENTS

| | | |
|---|---|---|
| EP | 0 818 720 A | 1/1998 |
| EP | 1 063 837 A2 | 12/2000 |
| EP | 1 865 693 A | 12/2007 |
| GB | 2 347 593 A | 9/2000 |
| JP | 2001 272413 A | 10/2001 |
| WO | 2006/106640 A | 10/2006 |
| WO | WO-2008/084091 A2 | 7/2008 |

OTHER PUBLICATIONS

International Search Report, PCT/EP2008/050279, mailed Aug. 28, 2008.
Office Action from Chinese Patent Application No. 200880002198.X, dated Aug. 1, 2012.
Written Opinion for International Application No. PCT/EP2008/007977 (undated).
Office Action for Chinese Application No. 200880002198.X dated Aug. 3, 2011.
Search Report for European Application No. 09 166 952.3 dated Oct. 29, 2012.
"How to Enable Double Tap to Wake Feature on Nokia Lumia Phones;" Posted by Techniqued on Aug. 15, 2013; retrieved from <http://www.youtube.com/watch?v=UyKuJAb4tT8>.
International Search Report for Application No. PCT/EP2008/007977; dated Feb. 19, 2009.
Office Action for Canadian Application No. 2,673,738; dated Sep. 30, 2013.
"Shock (mechanics);" Wikipedia; retrieved on Jan. 29, 2014 from <http://en.wikipedia.org/wiki/Shock_(mechanics)>.
Written Opinion for International Application No. PCT/EP2008/050279; dated Aug. 28, 2008.
Office Action for India Application No. 3832/CHENP/2009 dated Sep. 17, 2004.
Office Action for Canadian Application No. 2,673,738 dated Apr. 23, 2012.
Office Action for Chinese Application No. 200880002198X dated Nov. 24, 2011.
Office Action for Canadian Application No. 2,673,738 dated Sep. 12, 2011.
Office Action for U.S. Appl. No. 11/950,799 dated Oct. 12, 2010.
Office Action for U.S. Appl. No. 11/950,799 dated Apr. 11, 2011.
Office Action for U.S. Appl. No. 11/950,799 dated Oct. 18, 2011.
Office Action for U.S. Appl. No. 11/950,799 dated Jul. 2, 2012.
Office Action for U.S. Appl. No. 11/950,799 dated Mar. 7, 2013.
Office Action for U.S. Appl. No. 11/950,799 dated Jul. 2, 2013.
Office Action from Canadian Patent Application No. 2,673,738, dated Jul. 11, 2014.
Office Action from European Patent Application No. 08 701 423.9, dated Dec. 23, 2009.
International Preliminary Report on Patentability from International Application No. PCT/EP2008/007977, dated Jun. 8, 2010.
International Preliminary Report on Patentability from International Application No. PCT/EP2008/050279, dated Jul. 14, 2009.
Office Action for Chinese Application No. 20088002198.X dated Dec. 4, 2014.
Office Action for corresponding European Application No. 09 166 952.3 dated Dec. 23, 2015.
Office Action for corresponding Indian Application No. 3832/CHENP/2009 dated Sep. 9, 2015.
Office Action for corresponding Canadian Application No. 2,673,738 dated Jun. 9, 2015.
Office Action for European Patent Application No. 09 166 952.3 dated Oct. 19, 2016, 6 pages.

* cited by examiner

MOBILE COMMUNICATION TERMINAL AND METHOD

FIELD

The disclosed embodiments generally relate to mobile terminals and more particularly to user input of mobile terminals.

BACKGROUND

Mobile terminals, or mobile (cellular) telephones, for mobile telecommunications systems like GSM, UMTS, D-AMPS and CDMA2000 have been used for many years now. In the older days, mobile terminals were used almost exclusively for voice communication with other mobile terminals or stationary telephones. More recently, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, exercise analysis, electronic games, calendar/organizer/time planner, word processing, etc.

One problem with mobile terminals is inadvertent actuation of keys of the keypad. This can result in undesired phone calls, or even worse, deletion of content in the mobile terminal, such as phone book records or photographs.

In the prior art, it is known to allow the user to lock the keypad to reduce the risk of inadvertent key actuations. However, when unlocking the keypad, the key sequence is often awkward with keys needed to be pressed in a certain sequence, to reduce the risk of inadvertent unlocking of the keypad.

Another problem in the prior art is with using the mobile terminal as a clock to tell the time. To allow this functionality, the terminal always shows the time, even when the keypad is locked. The problem with this is that power is used to show the time even though most of the time the user does not actually look at the display.

Consequently, there is a need to provide a mobile communication terminal and method providing a user interface which is easier to use in conjunction with keypad locking.

SUMMARY

According to a first aspect there has been provided a method for providing a user interface of a mobile communication terminal comprising a motion sensitive sensor, a keypad and a display, the mobile communication terminal being capable of being in at least an active mode and a key-lock mode, the method comprising: detecting, using the motion sensitive sensor, a first user input indicating a desire to switch modes; when the mobile communication terminal is in the active mode, as a response to the first user input, switching the mobile communication terminal to the key-lock mode; and when the mobile communication terminal is in the key-lock mode, as a response to the first user input, switching the mobile communication terminal to the active mode. Consequently, the user can switch modes simply by effecting a movement of the mobile communication terminal.

The detecting the first user input may involve detecting at least one tap on the mobile communication terminal. One or more taps is an easy user action requiring little user precision and can as such be actuated by the user while on the move.

The method may comprise, after the detecting, presenting a user indication prompting for confirmation to switch the modes of the mobile communication terminal; and detecting a second user input.

In the presenting the user indication, a clock may be presented on the display.

In the presenting the user indication, a single pulse vibration alert may be generated. Tactile feedback is both noticeable and discrete.

The second user input may be interpreted as a confirmation to switch modes.

The second user input being associated with switching modes may be an actuation of a key of the keypad.

The method may further comprise prior to the switching: ending the method when the second user input is associated with ending the method.

The method may further comprise prior to the switching: ending the method when a user input fails to be detected during a time-out period.

The method may further comprise: when switching is performed, generating a double pulse vibration alert.

A second aspect of the disclosed embodiments is a method for providing a user interface of a mobile communication terminal comprising a motion sensitive sensor, and a display, the method comprising: detecting using the motion sensitive sensor, a first user input; and as a response to the first user input, presenting a clock on the display. This allows the user to, in a simple way, instruct the mobile communication terminal to show a clock, reducing the need to provide a clock in key-lock mode, and thereby conserving battery power.

The detecting the first user input may involve detecting at least one tap on the mobile communication terminal.

The mobile communication terminal may be capable of being in at least an active mode and a key-lock mode, and the mobile communication terminal may be in the key-lock mode when the method is commenced, and the method may further comprise, after the presenting: detecting a second user input indicating a desire to switch to the active mode; and as a response to the first user input, switching the mobile communication terminal to the active mode.

The second user input may comprise a double tap of the mobile communication terminal.

A third aspect of the disclosed embodiments is a method for providing a user interface of a mobile communication terminal comprising a motion sensitive sensor, a keypad and a display, the mobile communication terminal being capable of being in at least an active mode and a key-lock mode, the method comprising: detecting, while the mobile communication terminal is in the active mode, using the motion sensitive sensor, a first user input indicating a desire to switch to the key-lock mode; and as a response to the first user input, switching the mobile communication terminal to the key-lock mode.

A fourth aspect of the disclosed embodiments is an apparatus being capable of being in at least an active mode and a key-lock mode, the apparatus comprising: a display; a keypad; a motion sensitive sensor; and a controller; wherein the controller is configured to detect, using the motion sensitive sensor, a first user input indicating a desire to switch modes; and the controller is further configured to, as a response to the first user input, when the apparatus is in the active mode, switch the apparatus to the key-lock mode, and the controller is further configured to, as a response to the first user input, when the apparatus is in the key-lock mode, switch the apparatus to the active mode.

The motion sensitive sensor may comprise a sensor selected from the group consisting of a tilt sensor and an accelerometer, or any combination of the above.

The apparatus may be comprised in a mobile communication terminal.

A fifth aspect of the disclosed embodiments is an apparatus being capable of being in at least an active mode and a key-lock mode, the apparatus comprising: a display; a keypad; a motion sensitive sensor; a controller; means for detecting, using the motion sensitive sensor, a first user input indicating a desire to switch modes; and means for, when the apparatus is in the active mode, as a response to the first user input, switching the apparatus to the key-lock mode, and means for, when the apparatus is in the key-lock mode, as a response to the first user input, switching the apparatus to the active mode.

A sixth aspect of the disclosed embodiments is an apparatus comprising: a display; a motion sensitive sensor; and a controller; wherein the controller is configured to detect, using the motion sensitive sensor, a first user input; and the controller is further configured to, as a response to the first user input, presenting a clock on the display. The apparatus may be comprised in a mobile communication terminal.

A seventh aspect of the disclosed embodiments is an apparatus comprising: a display a motion sensitive sensor; a controller; means for detecting using the motion sensitive sensor, a first user input; and means for, as a response to the first user input, presenting a clock on the display.

An eighth aspect of the disclosed embodiments is an apparatus being capable of being in at least an active mode and a key-lock mode, the apparatus comprising: a display; a keypad; a motion sensitive sensor; and a controller; wherein the controller is configured to detect, while the apparatus is in the active mode, using the motion sensitive sensor, a first user input indicating a desire to switch to the key-lock mode; and the controller is further configured to, as a response to the first user input, switch the apparatus to the key-lock mode. The apparatus may be comprised in a mobile communication terminal.

A ninth aspect of the disclosed embodiments is an apparatus being capable of being in at least an active mode and a key-lock mode, the apparatus comprising: a display; a keypad; a motion sensitive sensor; a controller; means for detecting, while the apparatus is in the active mode, using the motion sensitive sensor, a first user input indicating a desire to switch to the key-lock mode; and means for, as a response to the first user input, switching the apparatus to the key-lock mode.

A tenth aspect of the disclosed embodiments is a computer program product comprising software instructions that, when executed in a mobile communication terminal, performs the method according to the first aspect.

An eleventh aspect of the disclosed embodiments is a computer program product comprising software instructions that, when executed in a mobile communication terminal, performs the method according to the second aspect.

A twelfth aspect of the disclosed embodiments is a computer program product comprising software instructions that, when executed in a mobile communication terminal, performs the method according to the third aspect.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments will now be described in more detail, reference being made to the enclosed drawings, in which.

DETAILED DESCRIPTION OF THE INVENTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
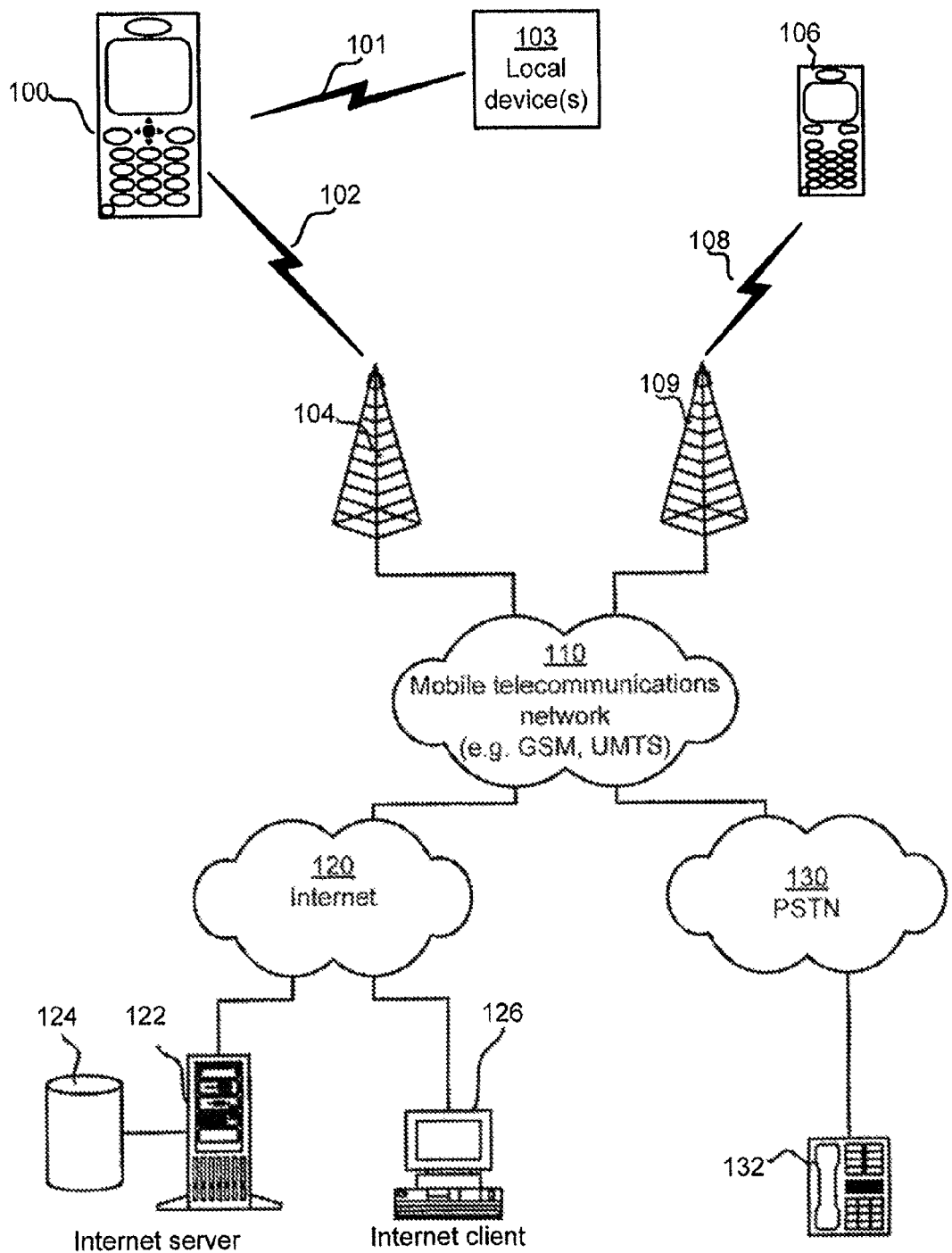
FIG. 1 is a schematic illustration of a cellular telecommunication system, as an example of an environment in which the disclosed embodiments may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between an apparatus being a mobile terminal (or mobile communication terminal) 100 according to the disclosed embodiments and other devices, such as another mobile terminal 106 or a stationary telephone 132. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
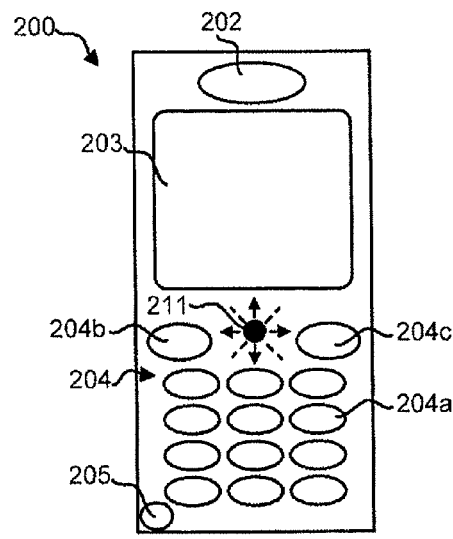
FIG. 2 is a schematic front view illustrating a mobile terminal according to an embodiment.

An embodiment 200 of the mobile terminal 100 is illustrated in more detail in FIG. 2. The mobile terminal 200 comprises a speaker or earphone 202, a microphone 205, a display 203 and a set of keys 204 which may include a keypad 204*a* of common ITU-T type (alpha-numerical keypad representing characters "0"-"9", "*" and "#") and certain other keys such as soft keys 204*b*, 204*c* and a joystick 211 or other type of navigational input device. The display 203 may be a regular display or a touch-sensitive display.

The internal component, software and protocol structure of the mobile terminal 200 will now be described with reference to FIG. 3. The mobile terminal has a controller 300 which is responsible for the overall operation of the mobile terminal and is preferably implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the mobile terminal. The software includes a real-time operating system 320, drivers for a man-machine interface (MMI) 334, an application handler 332 as well as various applications. The applications can include a personal exercise application 350, a media player application 360, as well as various other applications 370, such as applications for voice calling, video calling, sending and receiving SMS, MMS or email, web browsing, an instant messaging application, a phonebook application, a calendar application, a control panel application, a camera application, one or more video games, a notepad application, etc.

The MMI 334 also includes one or more hardware controllers, which together with the MMI drivers cooperate with the display 336/203, keypad 337/204 as well as various other I/O devices 339 such as microphone, speaker, vibrator, ringtone generator, LED indicator, etc. Additionally, a motion sensor 338 can be provided, being a sensor capable of detecting motion. The motion sensor could for example be a tilt sensitive sensor or an accelerometer being capable of sensing acceleration. The motion sensor 338 can be used for various purposes, such as user input, step counting, etc. The user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4A:
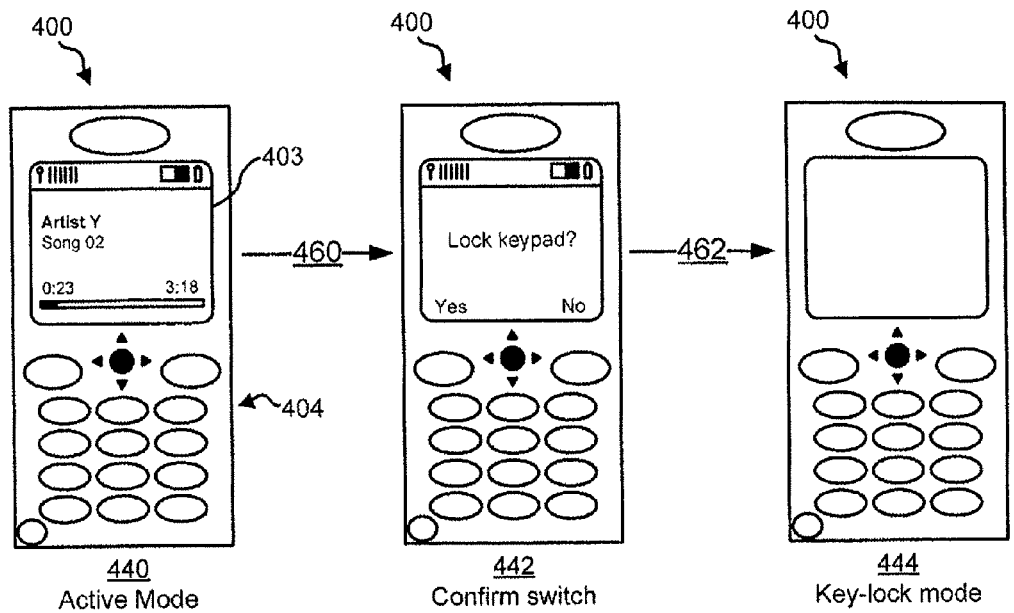
FIGS. 4*a* and 4*b* are a schematic diagrams showing how modes can be switched in the mobile terminal shown in FIG. 2.
Figure 4B:
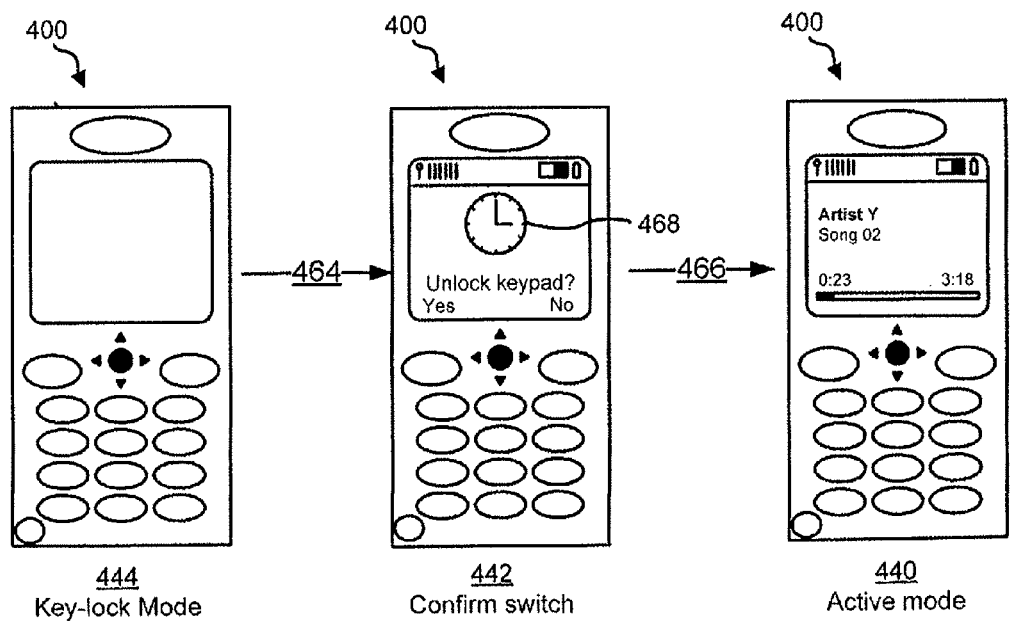

FIGS. 4*a* and 4*b* are a schematic diagrams showing how modes can be switched in the mobile terminal shown in FIG. 2.

In FIG. 4*a*, the terminal 400 is switched from an active mode 440 to a key-lock mode 444. The active mode is a mode in which the mobile terminal is active and all its inputs are active, such as keys 404, as well as outputs, such as the display 403.

The user then moves the mobile terminal 400 in such a way that a mode switch user input 460 is detected, indicating that the user wishes to go to the key-lock mode 444. More details about this mode switch user input 460 is described in conjunction with FIG. 5 below. Consequently, because the user instructs the mobile terminal 400 to lock the keypad using motion detectable means, this can be also performed while running another application, such as writing a text message or listening to a music player.

As a response to the mode switch user input 460, the mobile terminal 400 enters a confirm switch state 442. Here the user is requested to confirm or reject the mode switch. In this embodiment, the user responds by confirming with the left soft key and rejecting with the right soft key. If the user presses the right soft key and rejects the mode switch, the mobile terminal returns to the active mode 440. On the other hand, if the user confirms 462 by pressing the left soft key, the mobile terminal enters the key-lock mode 444. In one embodiment, the user confirms by repeating the user input used for the mode switch user input, and rejection is effected by no input being entered within a time-out period.

Once in the key-lock mode 444, the display is inactive and key backlight (if available) is inactive, saving power for the mobile communication terminal. Additionally, if the display is a touch-sensitive display, the driver for the touch-sensor of the display is optionally inactive.

In FIG. 4*b*, the terminal 400 is switched from the key-lock mode 444 to the active mode 440, in a manner much like the switch from active mode 440 to key-lock mode 444 shown in FIG. 4*a*.

While in the key-lock mode 444, the user moves the mobile terminal 400 in such a way that a mode switch user input 464 is detected, indicating that the user wishes to go to the active mode 440. The mode switch user input 464 can be the same as the mode switch user input 460 mentioned above.

As a response to the mode switch user input 464, the mobile terminal 400 enters a confirm switch state 442. Here the user is requested to confirm or reject to go to the active mode 440. Optionally, the display may in this mode show a clock 468 (analog or digital). Consequently, there is an easy way for the user to check the time by simply performing the mode switch user input 464. This reduces the need for showing a clock in the key-lock mode, thereby saving power. In this embodiment, the user responds by confirming with the left soft key and rejecting with the right soft key. If the user presses the right soft key or a time-out period of no activity expires, the mode switch is rejected and the mobile terminal returns to the key-lock mode 444. On the other hand, if the user confirms 466 by pressing the left soft key, the mobile terminal enters the active mode 440. In one embodiment, the user confirms by repeating the user input used for the mode switch user input 464.

Once in the active mode 440, the display and key backlight (if available) are again active. Additionally, if the display is a touch-sensitive display, the driver for the touch-sensor of the display is active.

Figure 5:
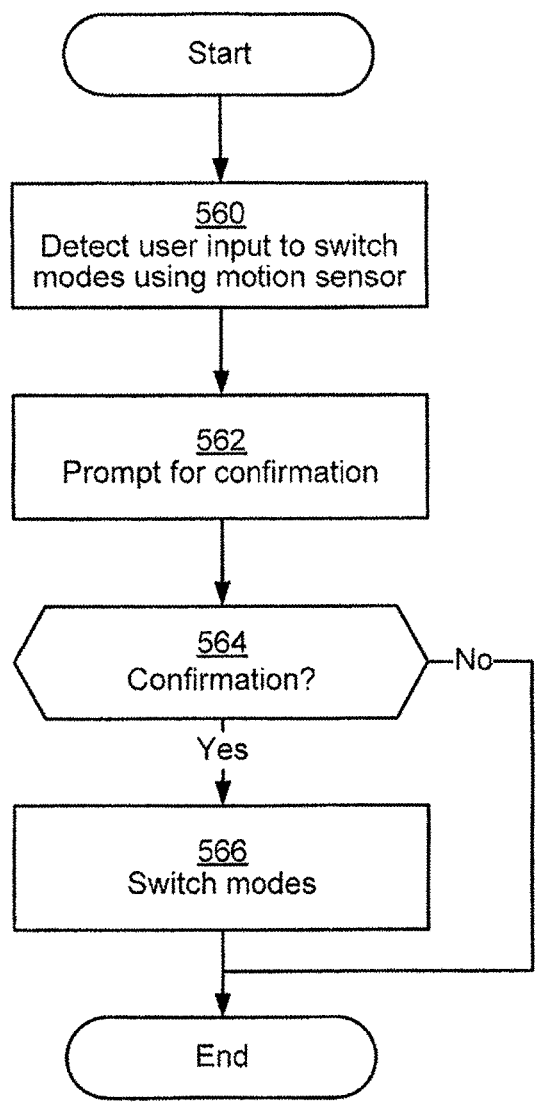
FIG. 5 is a flow chart illustrating a mode switch in the terminal of FIG. 2.

FIG. 5 is a flow chart illustrating a mode switch in the terminal of FIG. 2. The process illustrated in this flow chart is applicable both to a switch from the active mode to the key-lock mode and vice versa.

Figure 3:
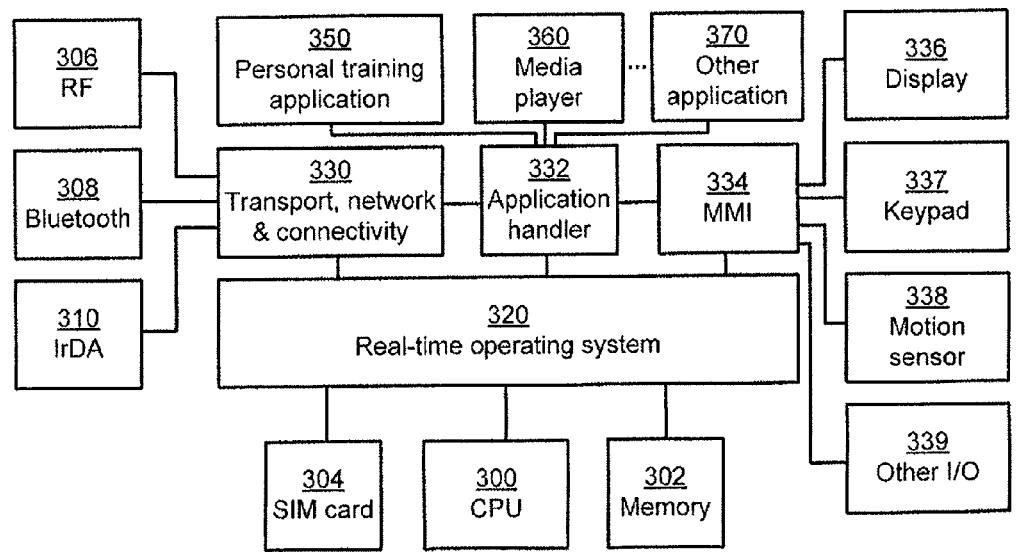
FIG. 3 is a schematic block diagram representing an internal component, software and protocol structure of the mobile terminal shown in FIG. 2.

In a detect user input to switch modes using motion sensor step 560, the mobile terminal 400 detects the mode switch user input using the motion sensor 338 (FIG. 3). The mode switch user input should be distinguishable from regular motions incurred while carrying the mobile terminal e.g. in a pocket or handbag. In one embodiment, the mode switch user input is a distinct single tap. Signal processing may be used to distinguish the single tap from regular motion of the mobile terminal. In one embodiment, the mode switch user input is a double tap, simplifying the distinction of the mode switch user input from regular motion of the mobile terminal. In one embodiment, the mode switch user input is a sequence of movements, e.g. tilt phone left, tilt phone right, tilt phone back. It is to be observed that any other suitable motion can be used for the mode switch user input; the invention is not limited to the examples mentioned above. In one embodiment, the mode switch user input is a tap on the display, the display being a touch sensitive display.

In a prompt for confirmation step 562, the user is queried whether the mode switch indicated by the mode switch user input is to be effected. For example, a message is shown on the display prompting the user if the keypad is to be locked (if the mobile terminal is initially in active mode) or unlocked (if the mobile terminal is initially in key-lock mode). Optionally, as described above, a clock can be displayed at the same time. Moreover, tactile feedback can optionally be given to the user, for example a single pulse vibration alert, giving the user clear feedback that the mobile terminal has understood the input to switch modes.

In a conditional confirmation step 564, the user either confirms or rejects the mode switching. The user can confirm, e.g. by pressing a soft button associated with confirmation, a voice command, a specific motion of the mobile terminal such as the motions described above in conjunction with step 560, etc. The user can reject e.g. by pressing a soft button associated with rejection, a voice command, a specific motion of the mobile terminal, etc. Optionally, if no user input is detected within a time-out period, it can be interpreted as a rejection. The time-out period can for example be 5 s, 10 s, or any other suitable time period. If the user confirms the mode switch, the process continues to a switch modes step 566. On the other hand, if the user rejects the mode switch, the process ends and the mobile terminal remains in the mode that the mobile terminal was in when this process was started.

It is to be noted that the prompt for confirmation step 562 and the conditional confirmation step 564 are optional steps.

In the switch modes step 566, the mode is switched. More specifically, if the initial mode was the active mode, the mobile terminal is switched to key-lock mode and if the initial mode was the key-lock mode, the mobile terminal is switched to the active mode. Optionally, tactile feedback can again be given to the user, for example a double pulse vibration alert, giving the user clear feedback that the mobile terminal has understood the confirmation to switch modes. After this step the process ends.

It is to be noted that although in the embodiment described above, it is described mode switches between an active mode and a key-lock mode, the invention is not limited to mode switches between these modes; the invention can be applied to any suitable mode switch.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
   detecting, using a motion sensor in a mobile communication terminal, a user input comprising a double tap on a display of the mobile communication terminal indicating a desire to switch modes comprising switching from a key-lock mode to an active mode, wherein one or more functions including keys of the mobile communication terminal that are inactive in the key-lock mode become active in the active mode;
   after detection of the user input, presenting an indication prompting for confirmation to switch said modes of said mobile communication terminal;
   detecting in the mobile communication terminal a second input in response to the indication; and
   activating the one or more functions including the keys of the mobile communication terminal in response to switching to the active mode,
   wherein in response to the double tap while the mobile communication terminal is in a key-lock mode, presenting an indication prompting for confirmation comprises switching to a confirm switch mode in which a confirmation to exit said key-lock mode is presented with a time of day on a display, and wherein in an instance in which exiting said key-lock mode is confirmed, the method then switches the mobile communication terminal to the active mode,
   wherein the time of day is presented during confirmation of a transition from the key-lock mode to the active mode, but the time of day is not presented during a different type of transition, and
   wherein the key-lock mode is a mode in which one or more keys of the mobile communication terminal are locked and the active mode is a mode in which all inputs and outputs are active.

2. The method according to claim 1, wherein the mobile communication terminal comprises a touch-sensitive display, and wherein detecting the user input comprises detecting, with the motion sensor, the double tap on the touch-sensitive display.

3. The method according to claim 1, wherein the mobile communication terminal comprises a display, and wherein activating the one or more functions comprises activating a driver for the display.

4. The method according to claim 1, wherein the mobile communication terminal comprises one or more keys, and wherein activating the one or more functions comprises causing the one or more keys to be backlighted.

5. The method according to claim 1, wherein activating the one or more functions comprises causing a time of day to be displayed.

6. The method according to claim 1, wherein battery power of the mobile communication device is conserved in the key-lock mode relative to the active mode.

7. The method according to claim 1, wherein the second input that provides confirmation to switch modes comprises a voice input.

8. The method according to claim 1, wherein, when in the key-lock mode and the active mode, no time of day is presented on the display.

9. The method according to claim 1, wherein the time of day is presented during confirmation of a transition from the key-lock mode to the active mode, but the time of day is not presented during confirmation of a transition from the active mode to the key-lock mode.

10. The method according to claim 1, wherein when said mobile communication terminal is in the active mode, as a response to said second input, switching said mobile communication terminal to the key-lock mode, where, when in the key-lock mode a display of the mobile communication terminal is inactive but the mobile communications terminal remains responsive to the user input comprising the double tap to indicate a desire to switch modes.

11. An apparatus comprising:
a controller and a memory storing software, the memory and the software configured to, with the controller, cause the apparatus to:
detect, using a motion sensor in a mobile communication terminal, user input comprising a double tap on a display of the mobile communication terminal indicating a desire to switch modes comprising switching from a key-lock mode to an active mode, wherein one or more functions including keys of the mobile communication terminal that are inactive in the key-lock mode become active in the active mode;
after detection of the user input, present an indication prompting for confirmation to switch said modes of said mobile communication terminal;
detect in the mobile communication terminal a second input in response to the indication; and
activate the one or more functions including the keys of the mobile communication terminal in response to switching to the active mode,
wherein in response to the double tap while the mobile communication terminal is in a key-lock mode, the apparatus is further caused to present an indication prompting for confirmation by switching to a confirm switch mode in which a confirmation to exit said key-lock mode is presented with a time of day on a display, and wherein in an instance in which exiting said key-lock mode is confirmed, the apparatus is then caused to switch the mobile communication terminal to the active mode,
wherein the time of day is presented during confirmation of a transition from the key-lock mode to the active mode, but the time of day is not presented during a different type of transition, and
wherein the key-lock mode is a mode in which one or more keys of the mobile communication terminal are locked and the active mode is a mode in which all inputs and outputs are active.

12. The apparatus according to claim 11, wherein the motion sensor comprises a sensor selected from the group consisting of a tilt sensor and an accelerometer, or any combination of the above.

13. The apparatus according to claim 11, wherein said apparatus is comprised in the mobile communication terminal.

14. The apparatus according to claim 11, wherein the mobile communication terminal comprises a touch-sensitive display, and wherein the apparatus is caused to detect the user input by detecting, with the motion sensor, the double tap on the touch-sensitive display.

15. The apparatus according to claim 11, wherein the mobile communication terminal comprises a display, and wherein the apparatus is caused to activate the one or more functions by activating a driver for the display.

16. The apparatus according to claim 11, wherein the mobile communication terminal comprises one or more keys, and wherein the apparatus is caused to activate the one or more functions by causing the one or more keys to be backlighted.

17. The apparatus according to claim 11, wherein the apparatus is caused to activate the one or more functions by causing a time of day to be displayed.

18. The apparatus according to claim 11, wherein battery power of the mobile communication device is conserved in the key-lock mode relative to the active mode.

19. The apparatus according to claim 11, wherein the second input that provides confirmation to switch modes comprises a voice input.

20. The apparatus according to claim 11, wherein the memory and the software are further configured to, with the controller, cause the apparatus to, as a response to said user input when said apparatus is in said active mode, present a user indication prompting for confirmation to switch said modes of said apparatus, detect a second user input in response to the user indication, and switch said apparatus to said key-lock mode, where when in key-lock mode a display is inactive but the apparatus remains responsive to the user input comprising the double tap to indicate a desire to switch modes.

21. The apparatus according to claim 11, wherein, when in the key-lock mode and the active mode, no time of day is presented on the display.

22. The apparatus according to claim 11, wherein the time of day is presented during confirmation of a transition from the key-lock mode to the active mode, but the time of day is not presented during confirmation of a transition from the active mode to the key-lock mode.

23. A computer program product comprising a non-transitory memory storing software instructions that, when executed in the mobile communication terminal, performs the method according to claim 1.

* * * * *